United States Patent
Feix et al.

(10) Patent No.: US 8,457,919 B2
(45) Date of Patent: Jun. 4, 2013

(54) PROCESS FOR TESTING THE RESISTANCE OF AN INTEGRATED CIRCUIT TO A SIDE CHANNEL ANALYSIS

(75) Inventors: Benoit Feix, Aubagne (FR); Georges Gagnerot, Marseilles (FR); Mylene Roussellet, Les Milles (FR); Vincent Verneuil, Aix en Provence (FR)

(73) Assignee: Inside Secure, Aix-en-Provence Cedex (FR)

( * ) Notice: Subject to any disclaimer, the term of this patent is extended or adjusted under 35 U.S.C. 154(b) by 505 days.

(21) Appl. No.: 12/750,846

(22) Filed: Mar. 31, 2010

(65) Prior Publication Data

US 2011/0246119 A1    Oct. 6, 2011

(51) Int. Cl.
*G01R 27/28* (2006.01)
(52) U.S. Cl.
USPC ............. 702/117; 702/53; 702/133; 713/150; 713/153; 713/160; 713/161; 713/168; 713/189; 713/190; 713/191; 380/28; 380/44; 380/287; 380/229; 380/247; 380/248; 380/249; 380/250
(58) Field of Classification Search
USPC ................... 702/117, 53, 133; 713/150, 153, 713/160, 161, 168, 189, 190; 380/28, 44, 380/287, 229, 247, 248, 249, 250
See application file for complete search history.

(56) References Cited

U.S. PATENT DOCUMENTS

| | | | | |
|---|---|---|---|---|
| 5,818,738 | A * | 10/1998 | Effing | 702/117 |
| 6,246,970 | B1 * | 6/2001 | Silverbrook et al. | 702/117 |
| 7,269,529 | B2 * | 9/2007 | Okabe et al. | 702/117 |
| 7,827,413 | B2 * | 11/2010 | Liardet et al. | 713/189 |
| 2006/0020654 | A1 * | 1/2006 | Hubert | 708/492 |
| 2007/0244951 | A1 * | 10/2007 | Gressel et al. | 708/252 |
| 2008/0260143 | A1 * | 10/2008 | Ibrahim | 380/28 |
| 2008/0304343 | A1 * | 12/2008 | Yoshihara | 365/201 |

FOREIGN PATENT DOCUMENTS

| | | |
|---|---|---|
| EP | 1134653 A2 | 9/2001 |
| FR | 2818846 A1 | 6/2002 |

OTHER PUBLICATIONS

Walter, "Sliding Windows Succumbs to Big Mac Attack," (2001).*
Kocher, Timing Attacks on Implementations of Diffie-Hellmann, RSA, DSS, and Other Systems, Advances in Cryptography: Proceedings of CRYPTO, pp. 104-113, (1996).
Kocher et al., "Differencial Power Analysis," Advances in Cryptology: CRYPTO, pp. 388-397, (1999).
Brier et al., "Correlation Power Analysis with a Leakage Model," International Association fo rCryptologic Research, pp. 16-29, (2004.
Walter, "Sliding Windows Succumbs to Big Mac Attack," Cryptographic Hardware and Embedded Systems,pp. 286-299, (2001).

(Continued)

*Primary Examiner* — Jonathan C Teixeira Moffat
*Assistant Examiner* — Hyun Park
(74) *Attorney, Agent, or Firm* — Panitch Schwarze Belisario & Nadel LLP

(57) ABSTRACT

A process for testing an integrated circuit includes collecting a set of points of a physical property while the integrated circuit is executing a multiplication, dividing the set of points into a plurality subsets of lateral points, calculating an estimation of the value of the physical property for each subset, and applying to the subset of lateral points a step of horizontal transversal statistical processing by using the estimations of the value of the physical property, to verify a hypothesis about the variables manipulated by the integrated circuit.

16 Claims, 7 Drawing Sheets

OTHER PUBLICATIONS

Walter, "Longer Keys may facilitate Side Channel Attacks," Selected Areas in Cryptography, pp. 42-57, (2004).

FR Search Report issued on Nov. 3, 2010 in FR Application No. 1000833.

* cited by examiner

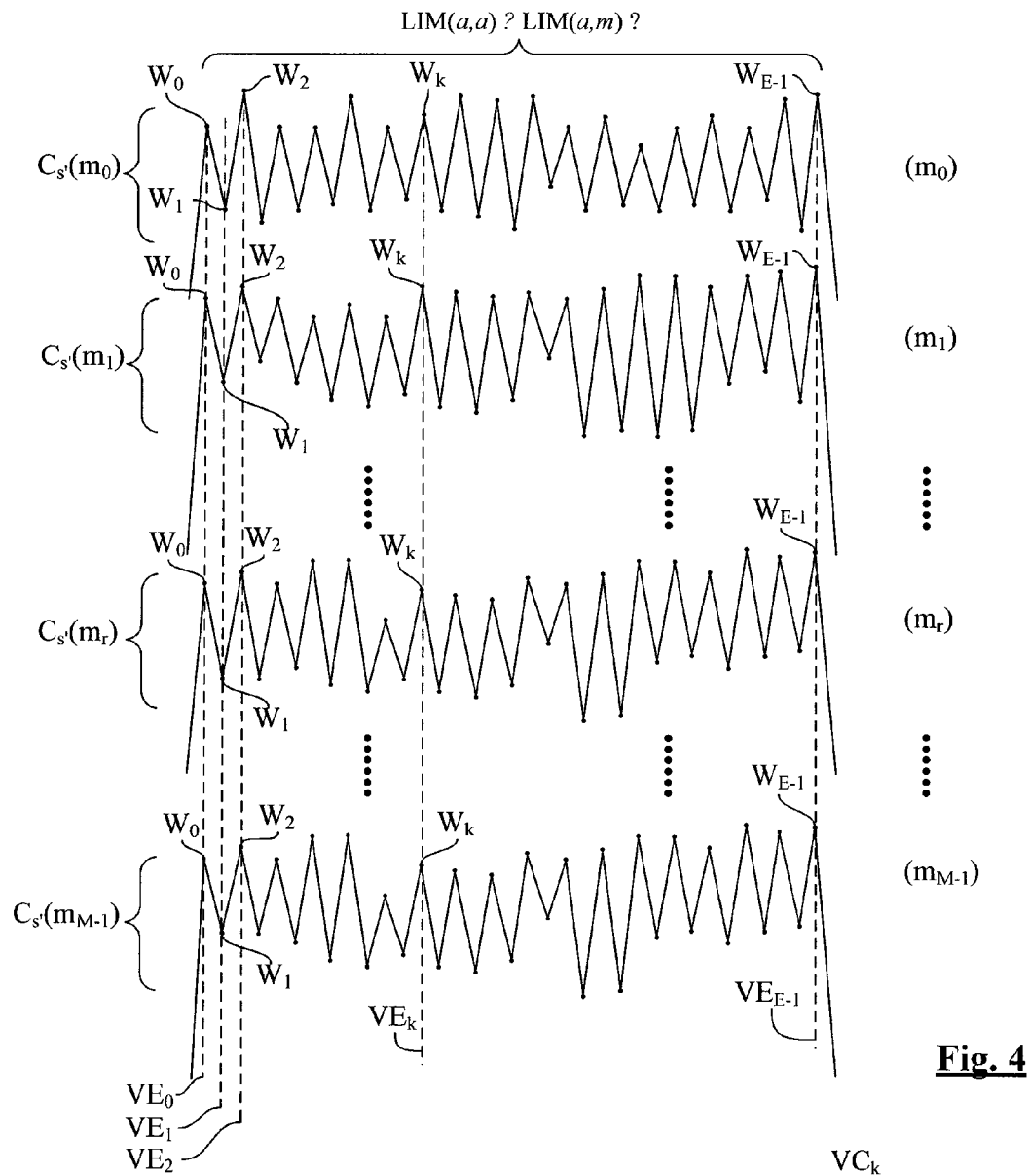
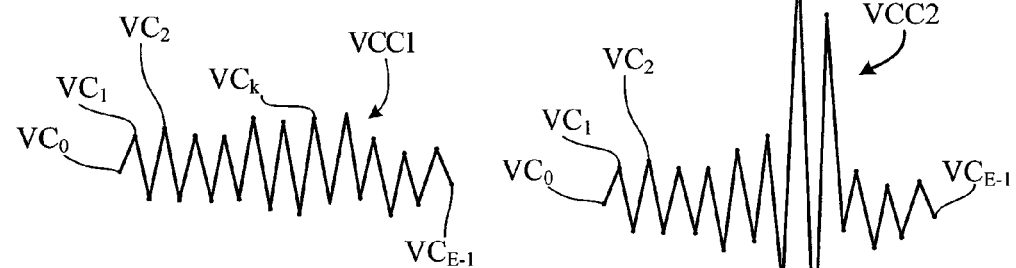
Fig. 4
Fig. 5A     Fig. 5B

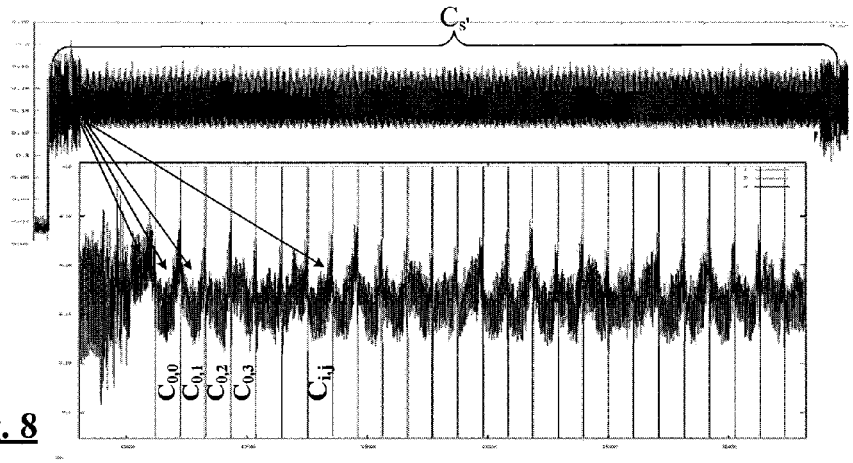
Fig. 8
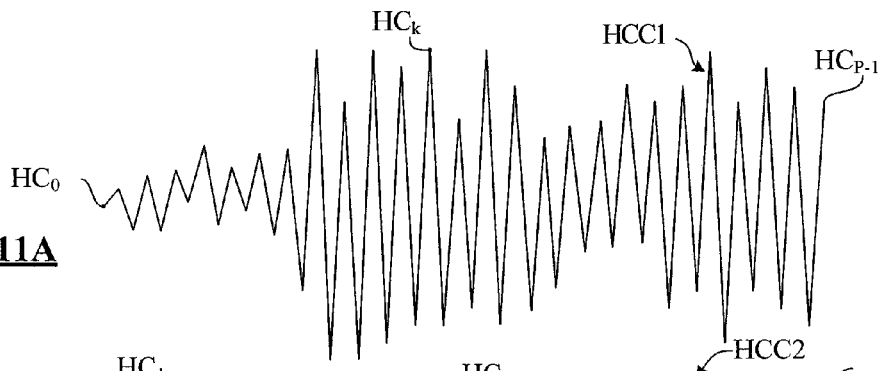
Fig. 11A
Fig. 11B
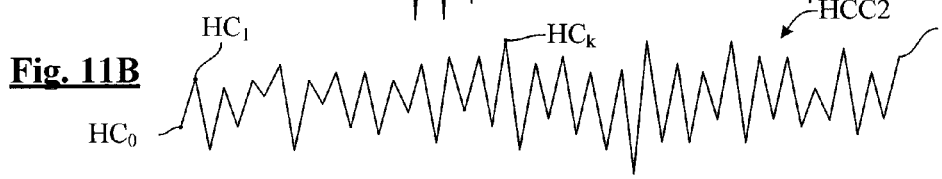
Fig. 12A
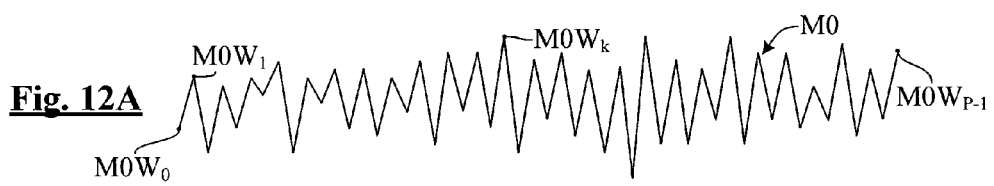
Fig. 12B
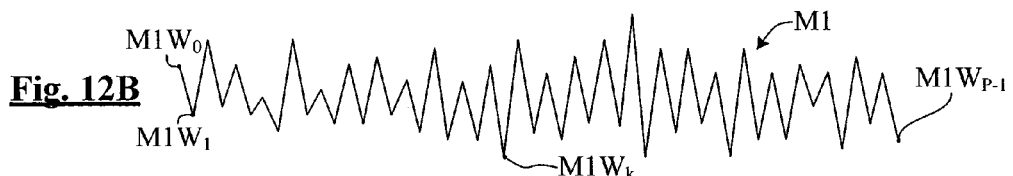
Fig. 12C
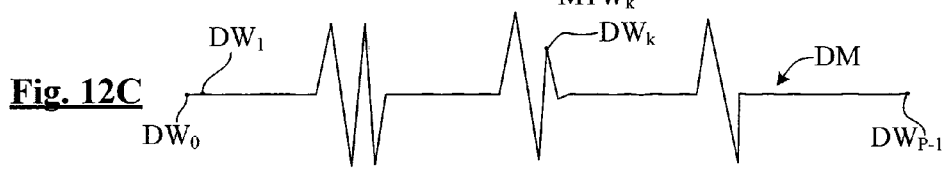

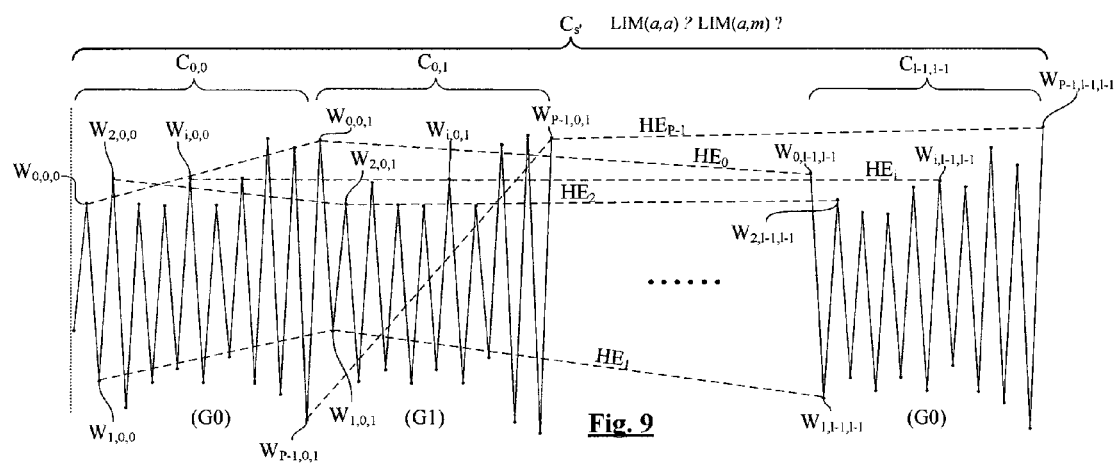

PROCESS FOR TESTING THE RESISTANCE OF AN INTEGRATED CIRCUIT TO A SIDE CHANNEL ANALYSIS

BACKGROUND OF THE INVENTION

Embodiments of the present invention relate to an integrated circuit including a multiplication function configured to execute a multiplication operation of two binary words x and y in a plurality of steps of basic multiplication of components $x_i$ of word x by components $y_j$ of word y.

Embodiments of the present invention relate in particular to an integrated circuit including an external data processing function, the execution of which includes at least conditional branching to at least a first multiplication step of binary words or a second multiplication step of binary words. The conditional branching is a function of a private data of the integrated circuit.

Embodiments of the present invention relate in particular to a process and system for testing of such an integrated circuit.

Embodiments of the present invention also relate to a process for protecting an integrated circuit of the above-mentioned type against a side channel analysis, and to a countermeasure allowing such an integrated circuit to pass a qualification or certification process including a test process according to embodiments of the invention.

Currently, secured processors that are more and more advanced may be found in chip cards or other embedded systems such as USB keys (flash drives), decoders and game consoles, and in a general manner, any Trusted Platform Module TPM. These processors, in the form of integrated circuits, generally have Complex Instruction Set Computer (CISC) 8-bit cores or Reduced Instruction Set Computer (RISC) cores of 8, 16, or more bits, 32-bit processors being the most widespread at this time. Some integrated circuits also include coprocessors dedicated to some cryptographic calculations, notably arithmetic accelerators for asymmetric algorithms such as Rivest, Shamir and Adleman (RSA), Digital Signature Algorithm (DSA), Elliptic Curve Digital Signature Algorithm (ECDSA), or the like.

FIG. 1 shows, as an example, a secure integrated circuit CIC1 arranged on a portable support Handheld Device (HD), for example, a plastic card or any other support. The integrated circuit includes a microprocessor MPC, an input/output circuit IOC or interface communication circuit, memories M1, M2, M3 linked to the microprocessor by a data and address bus and, optionally, a coprocessor CP1 for cryptographic calculations or arithmetic accelerator, and a random number generator RGEN. Memory M1 is a memory of the Random Access Memory (RAM) type containing volatile application data. Memory M2 is a non-volatile memory, for example an EEPROM or Flash memory, containing application programs. Memory M3 is a Read Only Memory (ROM) containing the operating system of the microprocessor.

The interface communication circuit IOC can be of the contact type, for example, according to the ISO/IEC 7816 standard, of the contactless type with inductive coupling, for example, according to the ISO/IEC 14443A/B or ISO/IEC 13693 standards, of the contactless type functioning by electric coupling (UHF interface circuit), or both of the contact and contactless type (integrated circuit called "combi"). The interface circuit IOC shown as an example in FIG. 1 is an inductive coupling contactless interface circuit equipped with an antenna coil AC1 to receive a magnetic field FLD. The field FLD is emitted by a card reader RD that is itself equipped with an antenna coil AC2. Circuit IOC includes apparatus for receiving and decoding data DTr emitted by the reader RD and apparatus for coding and emitting data DTx supplied by the microprocessor MPC. It may also include apparatus for extracting from the magnetic field FLD a supply voltage Vcc and a clock signal CK of the integrated circuit.

In some embodiments, the integrated circuit CIC1 may be configured to execute encryption, decryption, or signature operations of messages m that are sent to it, by way of a cryptographic function based on the modular exponentiation using a secret key d and a cryptographic module n, for example a cryptographic RSA function.

Overview Concerning Modular Exponentiation

The modular exponentiation function has the following mathematical expression:

$$m^d \operatorname{modulo}(n)$$

m being an input data, d an exponent, and n a divisor. The modular exponentiation function therefore consists of calculating the remainder on the division of m to the power d by n.

Such a function is used by various cryptographic algorithms, such as the RSA algorithm, the DSA algorithm, Elliptic Curve Diffie Hellman (ECDH), ECDSA, ElGamal, or the like. The data m is then a message to encrypt and the exponent d is a private key.

Such a function may be implemented using the following algorithm (modular exponentiation according to the Barrett method):

| Exponentiation algorithm |
| --- |
| Input: <br> "m" and "n" are integers such that m < n <br> "d" is an exponent of v bits such as d = $(d_{v-1}\, d_{v-2} ... d_0)_2$ <br> Output : a = $m^d$ modulo n <br> Step 1 : a = 1 <br> Step 2 : Pre-calculations of the Barrett reduction <br> Step 3 : for s from 1 to v do : <br>     (Step 3A) a = BRED(LIM(a,a),n) <br>     (Step 3B) if $d_{v-s}$ = 1 <br>         then a = BRED(LIM(a,m),n) <br> Step 4 : Return result a | wherein the message m and the module n are integers (for example of 1024 bits, 2048 bits, or more), d is the exponent of v bits expressed in base 2 ($d_{v-1}$, $d_{v-2}$, ... $d_0$), "LIM" is the multiplication function of large integers ("Long Integer Multiplication") and "BRED" is a reduction function according to the Barrett method ("Barrett REDuction") applied to the result of the LIM multiplication.

In an integrated circuit such as that shown in FIG. 1, such a modular exponentiation algorithm may be executed by the microprocessor MP or by the coprocessor CP1. Alternatively, some steps of the algorithm can be executed by the microprocessor whereas others are executed by the coprocessor, if it is merely an arithmetic accelerator. For example, the microprocessor may confide the LIM multiplications of steps 3A and 3B to the coprocessor, or else the entire calculation may be confided to the coprocessor, depending on the case.

In addition, the LIM multiplication of a by a (Step 3A) or of a by m (Step 3B) is generally executed by the integrated circuit by means of a multiplication function of binary words x and y. This multiplication includes a plurality of steps of basic multiplication of components $x_i$ ($a_i$) of word x by components $y_j$ ($a_j$ or $m_j$) of word y (i and j being iteration variables), to obtain intermediate results that are concatenated to form the general result of the multiplication.

Overview of Side Channel Analysis

In order to verify the level of security offered by a secure integrated circuit to be commercialized, qualification or certification tests are performed at the industrial level. In particular, tests are performed to assess the robustness of the integrated circuit to side channel analyses aiming to discover the secret data of the integrated circuit.

The exponentiation algorithm is therefore subjected to such controls. More particularly, the side channel analysis of the modular exponentiation algorithm consists of deducing bit-by-bit the value of the exponent, by observing the "behavior" of the integrated circuit during the execution of step 3 of the algorithm, at each iteration of rank s of this step. This observation aims to determine whether the considered step 3 includes step 3A only or includes step 3A followed by step 3B.

In the first case, it can be deduced that the bit $d_{v-s}$ of the exponent is equal to 0. In the second case, it can be deduced that the bit $d_{v-s}$ is equal to 1. By proceeding step-by-step for each iteration of s=1 to s=v, all the bits $d_{v-s}$ of the exponent for s from 1 to v-1 can be inferred. For example, during the first iterations of the exponentiation algorithm, the result of operations:

$$LIM(a,a), LIM(a,m)$$

reveals that the first bit of the exponent is 1, whereas the result of operations:

$$LIM(a,a)LIM(a,a)$$

allows for the discovery that the first bit of the exponent is 0.

To discover the next exponent bit, the nature of the following operations must be determined. For example, if these operations are:

$$LIM(a,a)LIM(a,m)LIM(a,a)LIM(a,m)$$

or:

$$LIM(a,a)LIM(a,a)LIM(a,m)$$

the two last operations LIM(a,a) LIM(a,m) reveal that the second bit of the exponent is 1. Inversely, after the following operations:

$$LIM(a,a)LIM(a,m)LIM(a,a)LIM(a,a)$$

$$LIM(a,a)LIM(a,m)LIM(a,a)LIM(a,a)$$

the third operation LIM (a,a) reveals that the second bit of the exponent is 0 because it is followed by LIM (a,a) and is not followed by LIM (a,m).

Thus, in order to determine the exponent bits, it is necessary to resolve any uncertainties as to the conditional branching steps performed by the integrated circuit as a function of these bits. The observation of the current consumption of the integrated circuit allows, in general, to clear up these uncertainties.

Overview of Side Channel Analysis Based on the Observation of the Current Consumption An electronic component generally includes thousands of logic gates that switch differently depending on the operations executed. The switching of the gates creates measurable current consumption variations of very short duration, for example of several nanoseconds. Notably, integrated circuits obtained by CMOS technology include logic gates constituted of pull-up PMOS transistors and of pull down NMOS transistors having a very high input impedance on their control gate terminal. These transistors do not consume current between their drain and source terminals except during their switching, corresponding to the switching to 1 or to 0 of a logic node. Thus, the current consumption depends on data manipulated by the microprocessor and on the various peripherals: memory, data circulating on the data or address bus, the cryptographic accelerator, and the like.

In particular, the multiplication operation of large integers LIM has a current consumption signature that is characteristic and is different than ordinary logic operations. Moreover, LIM(a,a) differs from LIM(a,m) in that it consists of calculating a square ($a^2$) whereas LIM(a,m) consists of calculating the product of a by m, which may lead to two different current consumption signatures.

Conventional side channel test processes, based on the observation of the current consumption, use Single Power Analysis (SPA), Differential Power Analysis (DPA), Correlation Power Analysis (CPA), or Big Mac Analysis.

SPA-Based Test Processes

SPA was disclosed in P. C. Kocher., Timing attacks on implementations of Diffie-Heliman, RSA, DSS, and other systems., Advances in Cryptology—CRYPTO '96, volume 1109 of Lecture Notes in Computer Science, pages 104-113., Springer 1996. SPA normally only requires the acquisition of a single current consumption curve. It aims to obtain information about the activity of the integrated circuit by observing the part of the consumption curve corresponding to a cryptographic calculation, because the current curve varies according to the operations executed and the data manipulated.

First of all, SPA allows for the identification of the calculations performed and the algorithms implemented by the integrated circuit. A test system captures a general current consumption curve of the integrated circuit by measuring its current consumption. In the case of an integrated circuit executing a modular exponentiation, consumption curves corresponding to the execution of LIM(a,a) and LIM(a,m) upon each iteration of rank s of the algorithm can be distinguished within this general current consumption curve, as shown in FIG. 2. In this consumption curve, curves $C_0$, $C_1$, $C_3$, ... $C_{s'}$, ... can be distinguished.

Each consumption curve $C_{s'}$ consists of consumption points measured with a determined sampling frequency. Each consumption curve corresponds to an "$s'^{th}$" iteration of step 3 of the exponentiation algorithm. The relation between the rank s' of each consumption curve $C_{s'}$ and the number of times "s" that step 3 of the exponentiation algorithm has already been executed (including the execution corresponding to the curve $C_{s'}$ in question) is given by the relation:

$$s'=s+H(dv\text{-}1, dv\text{-}2 \ldots dv\text{-}s\text{-}1)$$

if the curve $C_{s'}$ corresponds to the execution of step 3A, or by the relation:

$$s'=s+H(dv\text{-}1, dv\text{-}2 \ldots dv\text{-}s\text{-}1)+1$$

if the curve Cs' corresponds to the execution of step 3B.

The relation between s' and s is therefore a function of the Hamming weight $H(d_{v-1}, d_{v-2} \ldots d_{v-s-1})$ of the part of the exponent d already used during the preceding steps of the exponentiation calculation. As the Hamming weight represents the number of bits at 1 of the part of the exponent considered, s' is for example equal to s or to s+1 if the already used bits $d_{v-1}, d_{v-2} \ldots d_{v-s-1}$ of the exponent are all equal to zero. As another example, s' is equal to 2s or to 2s+1 if the bits $d_{v-1}, d_{v-2} \ldots d_{v-s-1}$ are all equal to 1.

An "ideal" SPA-based test process should allow for the determination of whether each curve $C_{s'}$ is relative to the calculation of LIM (a,a) or of LIM (a,m), merely by the observation of the form of these curves. This may allow for the deduction, according to the deductive method described above, of exponent bit value. However, to prevent such a leak of information ("leakage"), latest-generation secured integrated circuits are equipped with countermeasures that blur their current consumption.

Thus, SPA-based test processes generally allow for the identification of the calculations performed and the algorithms implemented by an integrated circuit, and for the marking, on the general consumption curve of the integrated circuit, of the portion of the curve relative to the modular exponentiation calculation. However, they do not allow for the verification of hypotheses about the exact operation executed by the integrated circuit.

Processes based on statistical analysis techniques, such as DPA or CPA, were thus developed to identify the nature of operations during which the exponent is manipulated.

DPA-Based Test Processes

Disclosed by P. C. Kocher, J. Jaffe, and B. Jun., Differential Power Analysis. Advances in Cryptology—CRYPTO '99, volume 1666 of Lecture Notes in Computer Science, pages 388-397., Springer, 1999., and very closely studied since, DPA allows the secret key of a cryptographic algorithm to be found thanks to the acquisition of numerous consumption curves. The application of this technique the most researched until now concerns the DES algorithm, but this technique also applies to other algorithms of encryption, decryption, or signature, and in particular to modular exponentiation.

DPA consists of a statistical classification of the current consumption curves to find the searched-for information. It is based on the premise that the consumption of a CMOS technology integrated circuit varies when a bit switches from 0 to 1 in a register or on a bus, and does not vary when a bit remains at 0, remains at 1, or switches from 1 to 0 (parasitic capacitance discharge of the MOS transistor). Alternatively, it may be considered that the consumption of a CMOS technology integrated circuit varies when a bit switches from 0 to 1 or switches from 1 to 0 and does not vary when a bit remains equal to 0 or remains equal to 1. This second hypothesis allows conventional functions "Hamming distance" or "Hamming weight" to be used to develop a consumption model that does not require the knowledge of the structure of the integrated circuit in order to be applicable.

DPA aims to amplify this consumption difference thanks to a statistical processing based upon numerous consumption curves, aiming to bring out a correlation between the measured consumption curves and the formulated hypotheses.

During the acquisition phase of these consumption curves, a test system applies M random messages $m_0, m_1, m_2, \ldots, m_r \ldots m_{M-1}$ to the integrated circuit in a way that the integrated circuit calculates the transformed message by means of its cryptographic function (which is implicit or requires the sending of an appropriate encryption command to the integrated circuit).

As shown in FIG. 3, M current consumption curves $C(m_0)$, $C(m_1), C(m_2) \ldots, C(m_r), \ldots, C(m_{M-1})$ are thus collected. Each of these consumption curves results from operations executed by the integrated circuit to transform the message by way of the modular exponentiation function, but may also result from other operations that the integrated circuit may execute at the same time.

Thanks to SPA, consumption curves $C_s'(m_0), C_s'(m_1), C_s'(m_2) \ldots, C_s'(m_r), \ldots, C_2'(m_{M-1})$ are distinguished within these consumption curves. These consumption curves correspond to execution steps of the modular exponentiation algorithm. As indicated above, each curve of rank s' corresponds to the "$s^{th}$" execution of step 3 of the algorithm, for one of the M messages, and involves one bit of the exponent d of which it is desired to the determine the value.

During a processing phase, the test system estimates the theoretical current consumption $HW(d_{v-s}, m_r)$ of the integrated circuit at the calculation step in question. This consumption estimation is done for at least one of the two possible values of the searched-for bit $d_s$ of the exponent. The test system is, for example, configured to estimate the theoretical consumption that the execution of the function LIM(a,m) implies, and use this for all the values $m_r$ of the message m used during the acquisition. This theoretical consumption is for example estimated by calculating the Hamming weight of the expected result following the execution of the operation corresponding to the hypothesis in question.

On the basis of the current consumption estimation, the test system classes the consumption curves into two groups G0 and G1:

G0={curves $C_s'(m_r)$ correspond to a low consumption of the integrated circuit at the step s in question}, G1={curves $C_s'(m_r)$ should correspond to a high consumption of the integrated circuit at the step s in question}.

The test system then calculates the differences between the averages of the curves of the groups G0 and G1, to obtain a resulting curve, or statistical differential curve.

If a consumption peak appears in the statistical differential curve at the location chosen for the current consumption estimation, the test system deduces that the hypothesis concerning the bit $d_{v-s}$ value is correct. The operation executed by the modular exponentiation algorithm is thus here LIM(a,m). If no consumption peak appears, the average difference does not reveal a significant consumption difference (a signal comparable to noise is obtained), and the test system can either consider that the complementary hypothesis is verified ($d_{v-s}=0$, the executed operation is LIM(a,a)), or else proceed in a similar manner to verify this hypothesis.

DPA-based test processes have the drawback of being complicated to implement and require the capture of a very high number of current consumption curves. Moreover, hardware countermeasures exist (such as the provision of a clock jitter, the generation of background noise, or the like), which often require the provision of preliminary signal processing steps (synchronization, noise reduction, and the like) on the current consumption curves used for the acquisition. The number of current consumption curves to acquire in order to obtain reliable results also depends on the architecture of the integrated circuit studied, and may be anywhere from thousands to hundreds of thousands of curves.

CPA-Based Test Processes

CPA was disclosed by E. Brier, C. Clavier, and F. Olivier., Correlation Power Analysis with a Leakage Model., Cryptographic Hardware and Embedded Systems—CHES 2004, volume 3156 of Lecture Notes in Computer Science, pages 16-29., Springer, 2004. The authors propose a linear current consumption model that supposes that the switching of a bit from 1 to 0 consumes the same amount of current as the switching of a bit from 0 to 1. The authors further propose to calculate a correlation coefficient between, on the one hand, the measured consumption points that form the captured consumption curves and, on the other hand, an estimated consumption value calculated from the linear consumption model and from a hypothesis as to which operation the integrated circuit executes.

FIGS. 4 and 5 show an example of CPA applied to the modular exponentiation algorithm. In this example, the test system looks to know whether at the $s^{th}$ iteration of step 3 of the modular exponentiation algorithm, the operation executed after LIM(a,a) is again LIM(a,a) (that is, step 3A of the following iteration s+1) or else LIM(a,m) (that is, step 3B of the iteration of rank s).

As shown in FIG. 4, the test system acquires M current consumption curves $C_s'(m_r)$ ($C_s'(m_0)$, $C_s'(m_1)$, ..., $C_s'(m_r)$, ..., $C_s'(m_M)$) relating to the same iteration of the algorithm, each corresponding to a message $m_r$ ($m_0$, $m_1$ ... $m_r$ ... $m_{M-1}$) that was sent to the integrated circuit. Each curve $C_s'(m_r)$ includes E current consumption points $W_0$, $W_1$, $W_2$, ..., $W_1$, ..., $W_{E-1}$ forming a first subset of points. The points of a same curve $C_s'(m_r)$ are associated with a current consumption estimation.

To this end, the current consumption HW is for example modeled as follows:

$$W=k1*H(D\oplus R)+k2$$

"R" being a reference state of the calculation register of the integrated circuit, "D" being the value of the register at the end of the operation in question, k1 being a proportionality coefficient, and k2 representing the noise and/or current consumed that is not linked to $H(D\oplus R)$. The function "H" is the Hamming distance between the values R and D of the register, that is the number of different bits between D and R ("$\oplus$" designating the exclusive OR function).

According to a simplified approach, the reference value R of the register is chosen to be equal to 0, such that the calculation of the estimated current consumption point comes down to calculating the Hamming weight (number of bits at 1) of the result of the operation in question. This result is, for example, "a*m" for the hypothesis concerned. It results that the estimated consumption point HW is equal to H(a*m). The hypothesis about the executed operation, for example LIM(a, m), is therefore transformed into a current consumption estimation HW calculated by applying this linear consumption model.

As shown in FIG. 4, the test system then regroups the different current consumption points $W_k$, forming each curve $C_{s'}$, into vertical transversal subsets $VE_k$ ($VE_0$, $VE_1$, $VE_2$, ..., $VE_k$, ... $VE_{E-1}$, each including points $W_k$ of same rank k of each of the curves $C_s'$. Each vertical transversal subset $VE_k$ is shown by vertical dashed lines and contains a number of points equal to the number M of curves used for the analysis.

An estimated current consumption point $HW_k$ is associated with each point $W_k$ of a vertical transversal subset $VE_k$. This estimated point corresponds to the estimation of the consumption associated with the curve $C_s'(m_r)$ to which the point belongs, calculated in the manner indicated above.

For each vertical transversal subset $VE_k$, the test system then calculates a linear vertical correlation coefficient $VC_k$ between the points $W_k$ of the considered subset and the estimated consumption points $HW_k$ that are associated therewith. This correlation coefficient is, for example, equal to the covariance between the measured consumption points $W_k$ of subset $VE_k$ and the estimated consumption points $HW_k$ associated with these measured consumption points, divided by the product of the standard deviations of these two sets of points. Thus, a vertical correlation coefficient $VC_k$ corresponding to the evaluated hypothesis is associated with each vertical transversal subset $VE_k$.

As shown in FIGS. 5A, 5B, the test system thereby obtains a set of vertical correlation coefficients $VC_0$, $VC_1$, ..., $VC_k$, ..., $VC_{E-1}$ forming a vertical correlation curve VCC1 that invalidates the hypothesis or forming a vertical correlation curve VCC2 that confirms the hypothesis. The curve VCC2 presents one or more noticeable correlation peaks (normalized covariance values close to +1 or −1), thus indicating that the hypothesis about the operation is correct. The curve VCC1 does not present a correlation peak. If the correlation curve VCC2 is obtained, the test program deduces that the integrated circuit was performing LIM(a,m) when the curves $C_s(m_0)$ to $C_s(m_{M-1})$ were acquired, and therefore deduces that the bit $d_s$ of the modular exponentiation exponent is equal to 1.

Big Mac-Based Test Processes

The Big Mac analysis was disclosed in Colin D. Walter., Sliding Windows Succumbs to Big Mac Attack., Cryptographic Hardware and Embedded Systems—CHES 2001, volume 2162 of Lecture Notes in Computer Science, pages 286-299., Springer, 2001; and Colin D. Walter., Longer keys may facilitate side channel attacks., Selected Areas in Cryptography, SAC 2003, volume 3006 of Lecture Notes in Computer Science, pages 42-57., Springer, 2003. This analysis is based on the atomicity of the above-mentioned large integer multiplication, that is to say the fact that the execution of a multiplication operation of two large integers includes the execution of a plurality of basic multiplications $x_i*y_j$ of components $x_i$ and $y_3$ of operands x and y subject of the multiplication.

A Big Mac-based test process includes steps of
  combining consumption sub-curves corresponding to basic multiplications $x_i*y_i$ for a fixed data $x_i$ and for a variable index j, then
  calculating the average value of points of these sub-curves to obtain a resulting sub-curve that represents the properties of $x_i$ in a more apparent manner than the properties of $y_j$,
  forming a dictionary with average sub-curves, and afterwards, and
  identifying, by way of the dictionary, new sub-curves issuing from following multiplications, to deduce therefrom the value of operands handled by following multiplication operations.

Summary of Known Test Processes

As it has just been seen, test processes based on DPA and CPA require the acquisition of numerous current consumption curves. Even though CPA-based test processes are more efficient than DPA-based test processes and generally only require between a hundred and several hundred consumption curves as opposed to thousands to hundreds of thousands of curves for DPA processes, the number of curves to acquire to implement a CPA-based test process cannot be considered as negligible.

Additionally, DPA- or CPA-based test processes can be countered by countermeasures consisting of masking the message m and/or masking the exponent d using random words. Indeed, it has been seen that the hypothesis concerning the consumption linked to LIM(a,m) requires the knowledge of the message m to calculate its Hamming weight. A masking of the message using random data no longer allows for the association of an estimated consumption value with a measured consumption value to calculate the weighting coefficient.

Finally, a Big Mac-based test process is tricky to implement and requires a good knowledge of the integrated circuit architecture in order to develop a dictionary including the models required for its implementation. The results obtained have been considered as unsatisfactory and the process does not seem to be the subject of known practical applications.

BRIEF SUMMARY OF THE INVENTION

Embodiments of the invention relate to a side channel test process applicable in particular, but not exclusively, to modular exponentiation calculation, that is simple to implement and requires a reduced number of curves of current consumption, or of any other physical property representative of the integrated circuit's activity.

Embodiments of the present invention also relate to a side channel test process applicable to an integrated circuit executing a multiplication operation of two binary words x and y including a plurality of basic multiplication steps of components $x_i$ by components $y_j$ of words x and y.

Embodiments of the present invention also relate to a side channel test process to be integrated in an industrial qualification or certification process of integrated circuits, to verify their robustness to side channel attacks and their resistance to information leakage.

Embodiments of the present invention also relate to countermeasures allowing an integrated circuit to be considered as suitable for use after a qualification or certification process including a test process according to embodiments of the invention.

More particularly, embodiments of the invention relate to a process for testing an integrated circuit device, including: during the execution by the integrated circuit of a multiplication operation of two binary words x and y having a plurality of basic multiplication steps of components xi of the word x by components yj of the word y, collecting a set of points of a physical property representative of the switching of binary data by the integrated circuit; dividing the set of points of the physical property into a plurality of subsets of lateral points, each subset corresponding to a basic multiplication operation of a component xi of rank i of the word x by a component yj of rank j of the word y; forming at least one general hypothesis about a value of x and/or a value of y; for each subset of lateral points, forming a particular hypothesis about a value of an xi and/or of a yj linked to the general hypothesis; for each subset of lateral points, calculating an estimation of the value of the physical property that is a function of the particular hypothesis, and attributing this estimation to the subset and to the points of the subset; and applying to the subsets of lateral points a step of horizontal transversal statistical processing using the estimations of the value of the physical property associated with them, to determine whether the general hypothesis is correct.

In one embodiment, the step of horizontal transversal statistical processing includes: forming horizontal transversal subsets of points, each including points of the same rank belonging to different subsets of lateral points; forming a set of correlation coefficients by calculating, for each horizontal transversal subset, a correlation coefficient between, on the one hand, the points of subset and, on the other hand, the particular estimations of the value of the physical property associated with each of the points of the subset; and determining whether the general hypothesis is correct or not as a function of the profile of the set of correlation coefficients.

In one embodiment, determining whether the general hypothesis is correct includes searching for at least one correlation peak in the set of correlation coefficients.

In one embodiment, the step of horizontal transversal statistical processing includes: classing the subsets of lateral points in first and second groups as a function of the estimation of the value of the physical property that is attributed to them, by allocating to the first group the subset of points having a high estimation and to the second group a low estimation of the physical property; calculating average values of points of the same rank of each subset of the first group to obtain a first subset of average points; calculating average values of points of the same rank of each subset of points of the second group to obtain a second subset of average points; forming a subset of differential points including differential points equal to the difference between points of the same rank of the first and of the second subsets of average points; and determining whether the general hypothesis is correct or not as a function of the profile of the subset of differential points.

In one embodiment, determining whether the general hypothesis is correct includes searching for one or more peaks of the physical property in the subset of differential points.

In one embodiment, calculating an estimation of the value of the physical property for each subset of lateral points includes calculating the Hamming weight of a data that is a function of the value of the component xi and/or of the component yj associated with the subset of lateral points according to the particular hypothesis linked to the general hypothesis.

In one embodiment, the data function of the value of the component xi and/or yj is equal to one of the following values: xi, yj, xi*yj, $\alpha$*xi+$\beta$*yj, $\alpha$ and $\beta$ being weighting coefficients.

In one embodiment, the physical property is one of a current consumption of the integrated circuit, a magnetic field absorption, and an electromagnetic radiation of the integrated circuit, or a combination thereof.

In one embodiment, the process includes rejecting the integrated circuit if the statistical processing step allows for the verification that the general hypothesis is correct.

In one embodiment, the process is applied to an integrated circuit including: a processing function of external data, the execution of which includes at one step of conditional branching to at least a first step of multiplication of binary words or a second step of multiplication of binary words, the step of conditional branching being a function of private data of the integrated circuit; and a multiplication function configured to execute the multiplication steps designated by the conditional branching in a plurality of basic multiplication steps of components xi by components yj of words to multiply; and the process includes: addressing the external data to the integrated circuit; activating, in the integrated circuit, the processing function of the external data; collecting said set of points of a physical property during the execution by the integrated circuit of a multiplication that is the function of the conditional branching; forming at least one general hypothesis about the value of the private data and the value of binary words x, y subject to the multiplication, in relation with the value of the private data; dividing the set of points into a plurality of subsets of lateral points, each subset corresponding to a basic multiplication operation of a component xi of rank i of word x by a component yj of rank j of word y; for each subset of lateral points, forming a particular hypothesis about a value of an xi and/or of a yj linked to the general hypothesis; for each subset of lateral points, calculating an estimation of the value of the physical property that is a function of the particular hypothesis, and attributing this estimation to the subset and to the points of the subset; and applying to the subsets of lateral points a step of horizontal transversal statistical processing by using the estimations of the value of the physical property associated with them, to determine whether the general hypothesis about the value of the private data is correct.

In one embodiment, the process includes rejecting the integrated circuit as unable to conserve the private data if the statistical processing step allows for the verification that the general hypothesis is correct.

In one embodiment, the process is applied to an integrated circuit wherein the data processing function is a modular exponentiation function, the private data being an exponent of the modular exponentiation function.

In one embodiment, the process is applied to an integrated circuit wherein the data processing function is a cryptographic function including a modular exponentiation function, the private data being an exponent of the modular exponentiation function forming a private key of the cryptographic function.

Embodiments of the invention also relates to a system for testing an integrated circuit, including: an execution component configured to cause the integrated circuit to execute a multiplication operation of two binary words x and y including a plurality of basic multiplication steps of components xi of the word x by components yj of the word y; a measuring component configured to measure and collect, during the execution of the multiplication operation, a set of points of a physical property representative of the switching of binary data by the integrated circuit; and a data processor, configured to: divide the set of points of the physical property into a plurality of subsets of lateral points, each subset corresponding to a basic multiplication operation of a component xi of rank i of the word x by a component yj of rank j of the word y; forming at least one general hypothesis about a value of x and/or a value of y; for each subset of lateral points, forming at least one particular hypothesis about a value of an xi and/or of a yj linked to the general hypothesis; for each subset of lateral points, calculating an estimation of the value of the physical property that is a function of the particular hypothesis, and attributing this estimation to the subset of lateral points and to the points of the subset; and applying to the subset of lateral points a step of horizontal transversal statistical processing by using the estimations of the value of the physical property that they are attributed to the lateral points, to determine whether the general hypothesis is correct.

In one embodiment, the system is configured to reject the integrated circuit if the statistical processing step allows for the verification that the general hypothesis is correct.

In one embodiment, the measuring component is configured to measure one of a current consumption of the integrated circuit, a magnetic field absorption, and an electromagnetic radiation of the integrated circuit, or a combination thereof.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

Embodiments of a test process according to the invention and corresponding countermeasures will be described in a non-limiting manner in the following, in relation with the appended drawings in which:

In the drawings:

FIG. 1 shows a conventional architecture of a secure integrated circuit;

FIG. 2 shows a current consumption curve of the integrated circuit of FIG. 1 during the execution of a modular exponentiation;

FIG. 3 shows current consumption curves used to conduct conventional DPA- or CPA-based test process;

FIG. 4 shows in further detail current consumption curves used to conduct a conventional CPA-based test process;

Figure 6:
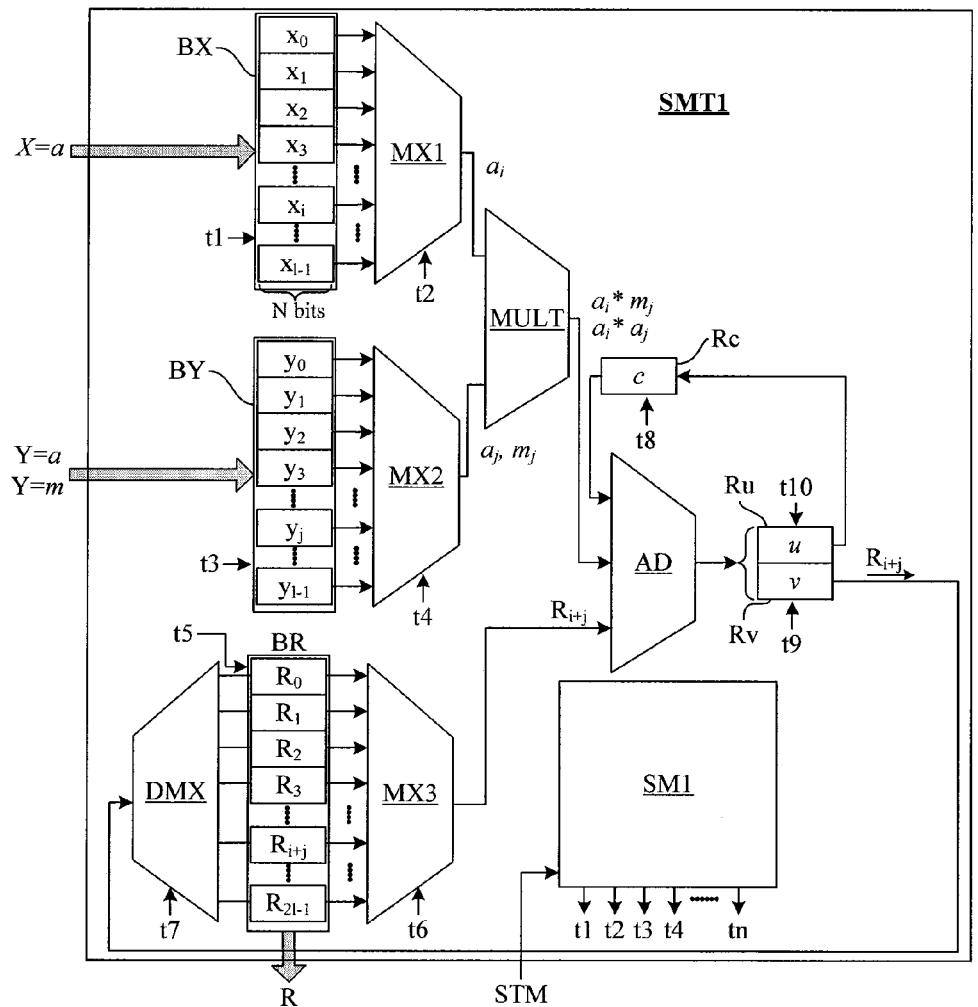
Figure 7:
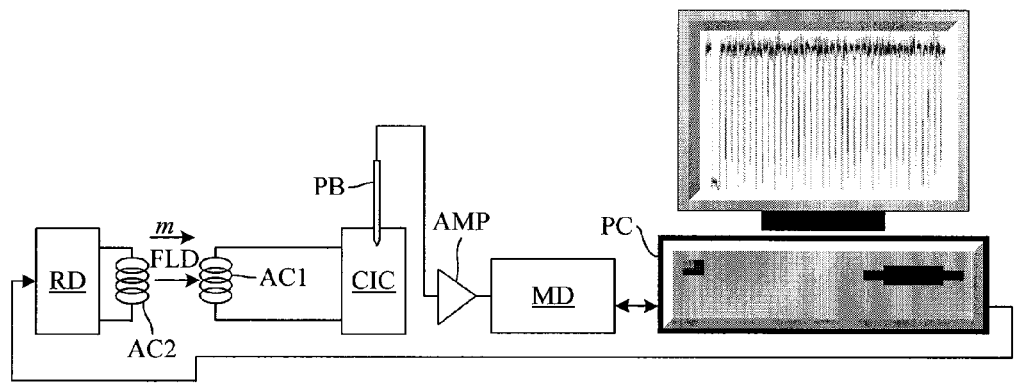
Figure 13:
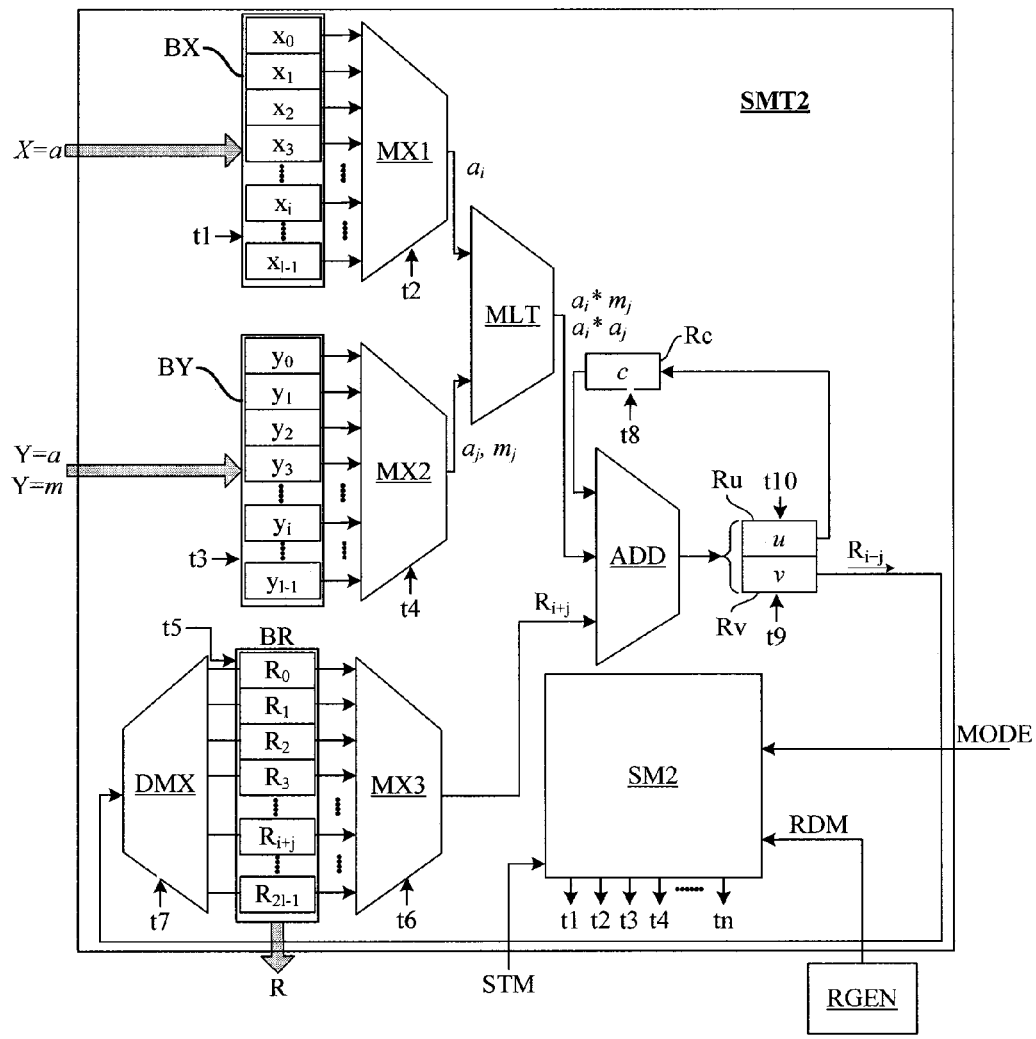
Figure 14:
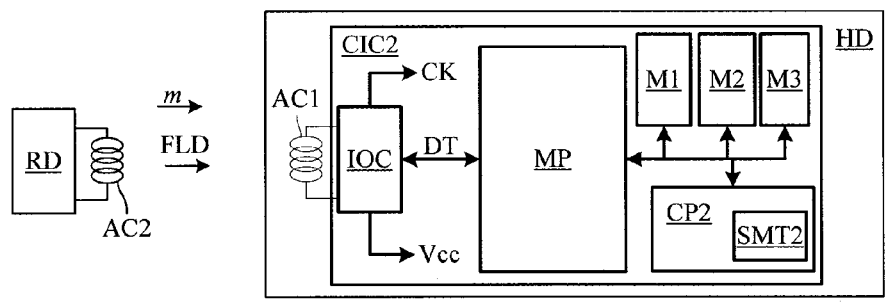

FIGS. 5A and 5B schematically show correlation curves supplied by a conventional CPA-based test process;

FIG. 6 schematically shows a circuit designed to execute a conventional multiplication algorithm;

FIG. 7 schematically shows an embodiment of a test system according to the invention;

FIG. 8 shows a current consumption curve including current consumption sub-curves used by the test system of FIG. 7 to implement the process according to embodiments of the invention;

FIG. 9 is a more-detailed view of current consumption sub-curves and shows a step of the process according to an embodiment of the invention;

FIG. 10 is a table of estimated values of a physical property associated with points of the sub-curves of FIG. 9;

FIGS. 11A and 11B schematically show two correlation curves generated by an embodiment of the test process according to the invention;

FIGS. 12A, 12B and 12C respectively show two average curves and a correlation curve generated by another embodiment of the test process according to the invention;

FIG. 13 schematically shows a multiplier circuit designed to execute a multiplication algorithm according to an embodiment of the invention; and FIG. 14 shows a secured integrated circuit architecture including countermeasure according to an embodiment of the invention.

DETAILED DESCRIPTION OF THE INVENTION

General Features of a Test Process According to Embodiments of the Invention

Embodiments of a test process according to the invention are based on a detailed examination of the current consumption of an integrated circuit during the execution of steps 3A and 3B of the above-described exponentiation algorithm, and more particularly, the observation of its current consumption during the execution of the LIM multiplication during each of these steps 3A and 3B.

Embodiments of a test process according to the invention are based on the fact that in practice, the multiplications of large integers LIM(a,a) and LIM(a,m) are not done in a single step due to the size of binary words accepted by the unit that performs these multiplications. The unit that executes the multiplication is, for example, the arithmetical and logical unit of the microprocessor, a coprocessor, or an arithmetic accelerator. The reduced size of the calculation unit requires a calculation algorithm LIM(x,y) that "splits" the large integers x and y into l components of smaller size, such that:

$$x=(xl\text{-}1\, xl\text{-}2 \ldots x0)b$$

$$y=(yl\text{-}1\, yl\text{-}2 \ldots y0)b$$

xl-1, xl-2 ... x0 and yl-1, yl-2 ... y0 being components of operands x and y in base "b", each component including N bits, and the base b being equal to 2N, for example b=232 for a calculation unit accepting operands of N=32 bits.

This splitting of operands into l equal parts is such that the multiplication includes l2 basic multiplication operations if the multiplication is done according to the usual method. Table 1 below gives the relation between the size G of operands x and y, the size N of their components xi, yj, the number l of components xi, yj to form an operand, and the number l2 of basic multiplications xi*yj that the execution of the LIM function includes, for typical examples of integrated circuit architectures.

TABLE 1

| Size G of operands x, y | Size N of components $x_i, y_j$ | Number l of components $x_i, y_j$ per operand (l = G/N) | Number $l^2$ of basic multiplications $x_i * y_j$ to obtain x * y |
|---|---|---|---|
| 2048 bits | 32 bits | 64 | 4096 |
| 2048 bits | 64 bits | 32 | 1024 |
| 1536 bits | 32 bits | 48 | 2304 |
| 1536 bits | 64 bits | 24 | 576 |
| 1024 bits | 32 bits | 32 | 1024 |
| 1024 bits | 64 bits | 16 | 256 |

Thus, each basic multiplication operation $x_i*y_j$ executed by the multiplication algorithm LIM corresponds to a current consumption sub-curve $C_{i,j}$, and these sub-curves together form the current consumption curve of step 3A or of step 3B of the exponentiation algorithm.

A test process according to embodiments of the invention includes horizontal transversal statistical processing steps to such sub-curves, in order to verify a hypothesis concerning the variables that are the subject of the multiplication, and thus to verify a hypothesis concerning a conditional branching leading to the execution of the multiplication operation with these variables. The process only requires the acquisition of a single consumption curve by sending a single message m to an integrated circuit.

Example of Implementation of the Test Process

Figure 1:
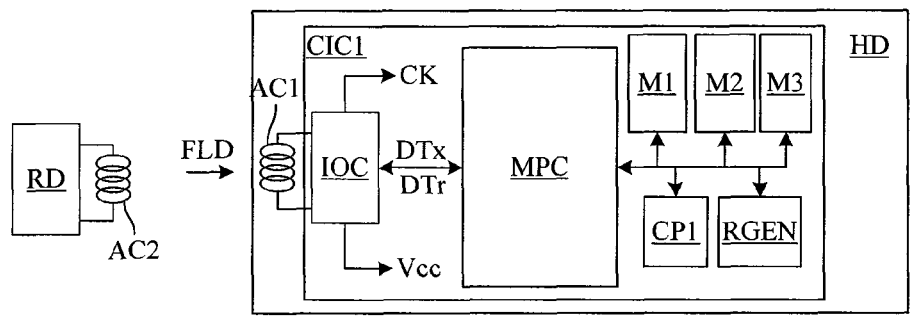
Figure 2:
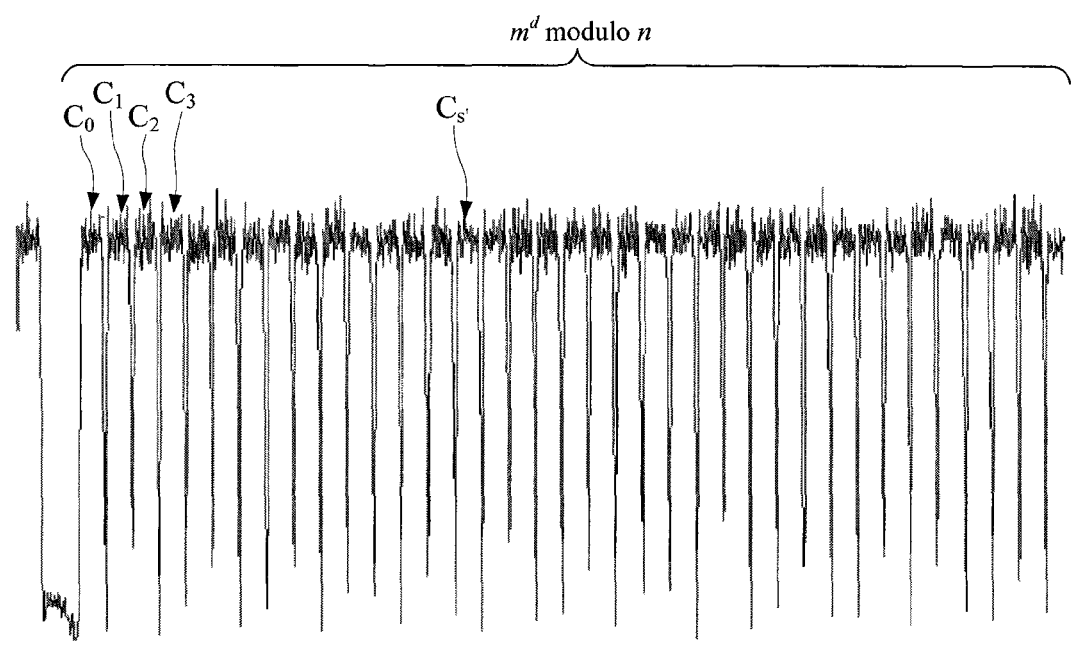
Figure 3:
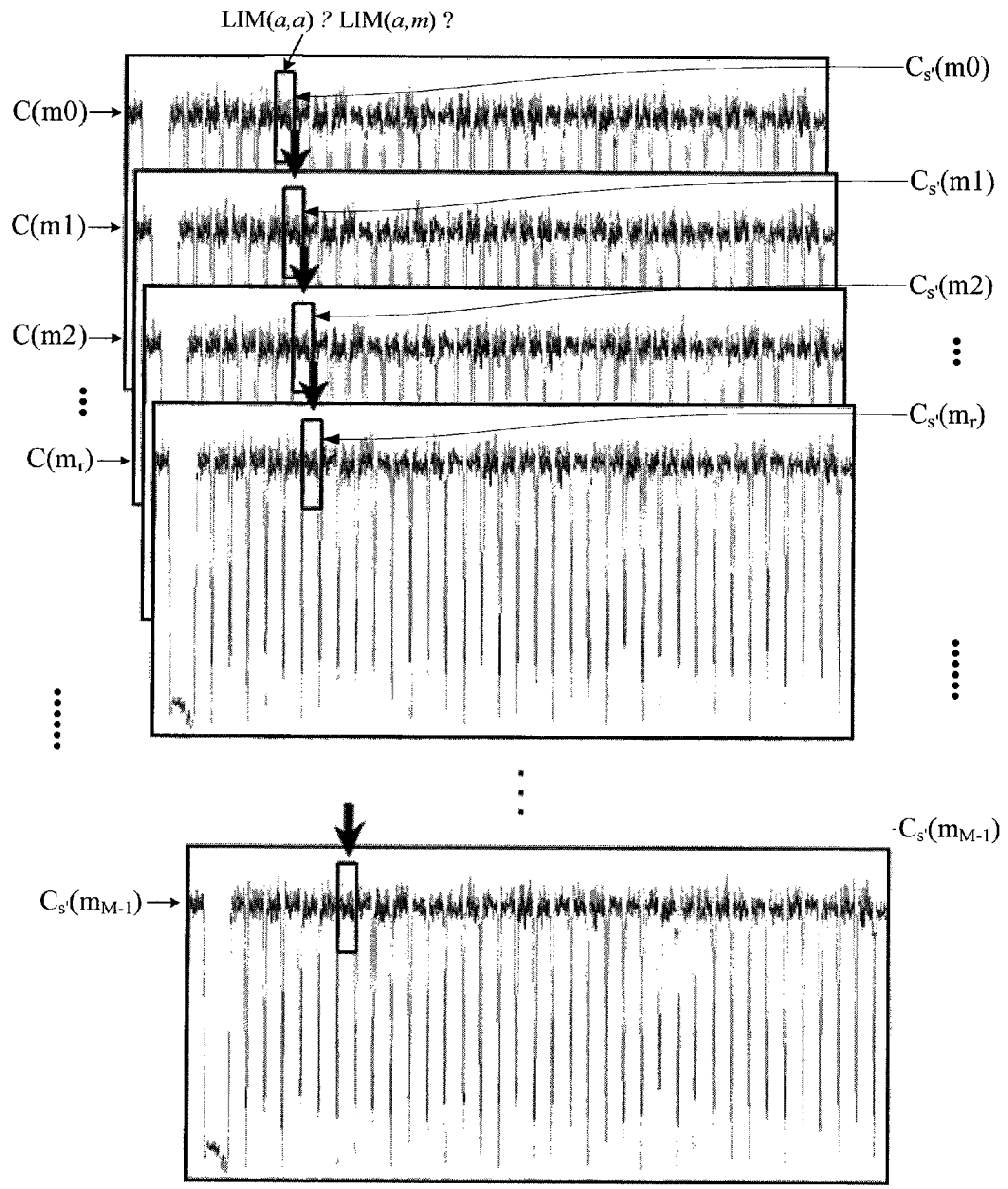

Embodiments of the test process that will be described in the following aim to determine the secret exponent used by an integrated circuit during a modular exponentiation calculation. The integrated circuit is, for example, the conventional integrated circuit CIC1 described above in relation with FIG. 1. The modular exponentiation calculation is, for example, executed according to the following algorithm, already described above:

---
Exponentiation algorithm

Input :
"m" and "n" of integer values such that m < n
"d" an exponent of v bits such that d = $(d_{v-1} d_{v-2}.... d_0)_2$
Output : a = $m^d$ modulo n
Step 1 : a = 1
Step 2 : Pre-calculations of the Barrett reduction
Step 3 : for s from 1 to v do :
    (Step 3A) a = BRED(LIM(a,a),n)
    (Step 3B) if $d_{v-s}$ = 1
        then a = BRED(LIM(a,m),n)
Step 4 : Return result a

---

As indicated above, finding a bit of the exponent d requires determining whether step 3 of the algorithm only includes step 3A or, on the contrary, includes step 3A followed by step 3B. Starting with the first iteration of step 3 (s=1) until the last (s=v), a test process according to embodiments of the invention allows for the determination, with a single current consumption curve, of whether the operation executed by the microprocessor or the coprocessor is of the LIM(a,a) type or of the LIM(a,m) type by basing itself on the consumption sub-curves corresponding to basic multiplications intervening in the execution of the LIM multiplication.

It will also be assumed in the following, still as an implementation example of the process, that the multiplication operation LIM intervening in the execution of the modular exponentiation algorithm is executed according to the scholar method, that is to say the most commonly used method to multiply large integers. The scholar method is, for example, implemented by way of the following algorithm:

---
Algorithm LIM (LIM multiplication - scholar method)

Inputs :
x = $(x_{l-1}, x_{l-2},... x_0)$b
y = $(y_{l-1}, y_{l-2},... y_0)$b
Output : R = LIM(x,y) = x*y = $(R_{2l-1} R_{2l-2}.... R_0)$b
Step 1 :
For i from 0 to 2l-1 do : $R_i$ = 0
Step 2 :
For i from 0 to l-1 do :
    c ← 0
    for j from 0 to l-1 do :
        u|v ← $(R_{i+j} + x_i*y_j)$ + c
        $R_{i+j}$ ← v and c ← u
    $R_{i+l}$ ← v
Step 3 : Return(R)

---

Wherein "|" designates the concatenation of intermediate variables u and v.

Thus, the $l^2$ iterative calculation steps involving components $x_i$, $y_j$ of the large integers x, y, allows 2l intermediate results $R_{2l-1}$, $R_{2l-2}$, ... $R_0$ of N bits to be obtained. These are concatenated in an output register to form the final result of the multiplication of x by y.

To get a better idea, FIG. 6 shows an example of multiplier hardware SMT1 provided to perform the multiplication of two operands x and y according to the algorithm above. The multiplier architecture is on the model of the algorithm and the multiplier SMT1 thus includes: input buffers BX, BY receiving operands x and y of G bits; an output buffer BR supplying the result R; a multiplier MULT with two N-bit inputs and a 2N-bit output; an adder AD having a 2N-bit input, two N-bit inputs, and a 2N-bit output; a 2N-bit output register including two concatenated registers Ru and Rv of N bits each to receive the intermediary variables u and v of the algorithm; and a register Rc to receive the carry c of the algorithm. A sequencer SM1, for example a state machine, supplies control signals t1, t2, . . . , t9, t10, . . . tn to these various elements, and is configured to execute the algorithm upon reception of a command STM ("Start Multiplication").

The buffer BX includes l registers of N bits, each receiving one of the components xl-1, xl-2, . . . , x0 of X. The buffer BY includes l registers of N bits, each receiving one of the components yl-1, yl-2, . . . , y0 of y. The output buffer BR includes 2l registers of N bits, each receiving one of the components R2l-1, R2l-2, . . . , R0 of the result of the multiplication of x by y. Multiplexers MX1, MX2 controlled by the sequencer SM1 allow for the application of one of the components xi upon one input of the multiplier and one of the components yj on the other input of the multiplier, which supplies the result xi*yj on 2N bits. The 2N-bit output of the multiplier MULT is linked to the 2N-bit input of the adder AD. N first bits of the 2N-bit output of the adder AD are applied to the input of the register Ru and the N other bits are applied to the input of the register Rv. The output of the register Rv is applied to the input of one of the registers Ri+j of the buffer BR by the intermediary of a demultiplexer DMX controlled by the sequencer SM1. The output of one of the registers Ri+j of the buffer BR is applied on an N-bit input of the adder by the intermediary of a multiplexer MX3 controlled by the sequencer SM1. The other N-bit input of the adder is linked to the output of the register Rc, the input of which is liked to the output of the register Ru. The sequencer SM1 controls the writing and the reading of these various registers for the execution of the algorithm.

Before the application of the command STM, the data to multiply "a and a" or "a and m" are saved in the buffers BX and BY as operands x and y, depending on whether the operation to be executed is LIM(a,a) or LIM(a,m). In the first case, registers xi of buffer BX receive components al-1, al-2, ..., a0 of a and registers yj of buffer BY receive the same components. In the second case, registers xi of buffer BX receive the components al-1, al-2, ..., a0 of a and registers yj of buffer BY receive the components ml-1, ml-2, ..., m0 of m.

Acquisition of Current Consumption Sub-Curves

FIG. 7 shows an example of an integrated circuit test system provided to implement the test process according to embodiments of the invention. It will be assumed, as an example, that the test system is configured to test the contactless integrated circuit CIC1 of FIG. 1.

The test system includes: a chip card reader RD, here a contactless reader; a measuring probe PB linked to a measuring device MD, such as a digital oscilloscope, to acquire the consumption curves of the integrated circuit; and a calculation component, such as a personal computer PC. The computer is linked to the measuring device and to the card reader RD and implements a test program. This test program includes, in particular, a program for communicating with the integrated circuit and to send messages thereto, a signal processing program, and a program for implementing calculation steps of the process according to the invention.

The probe PB may be a current probe (for example, a resistance placed on the supply terminal Vcc of the integrated circuit), or an electromagnetic probe linked to the measuring device by a signal amplifier AMP. Alternatively, a current probe can be combined with an electromagnetic probe. The study of electromagnetic radiation Electromagnetic Analysis (EMA) has shown that an electromagnetic radiation emitted by a functioning integrated circuit gives information about the switching of bits in the integrated circuit, similar to the measurement of current consumed. The advantage of an electromagnetic probe is that it may be placed near the part of the circuit of which it is desired to analyze the functioning (for example, near the core of the microprocessor or of the cryptographic calculations coprocessor).

In addition, in the case of a contactless integrated circuit, the current probe can be replaced by an inductive probe that measures the absorption, by the integrated circuit, of the magnetic field emitted by the reader. Such an inductive probe, for example an antenna coil, can itself be combined with an electromagnetic field probe placed near parts of the circuit to be studied.

Thus, in the present application, the term "current consumption" is used merely for the sake of simplicity, and designates any measurable physical property the variations of which are representative of binary data switching within the integrated circuit or within the part of the integrated circuit studied. The physical property may be measured at terminals of the integrated circuit or near the studied part of the integrated circuit.

The sampling frequency of the physical property must however be sufficiently high to collect several points per sub-curve, for example between 3 and 100 points per sub-curve in practice. However, it may be provided to collect up to several thousand points per sub-curve.

As shown in FIG. 8, a precise analysis of the current consumption curve Cs during the execution of each iteration of step 3 of the exponentiation algorithm reveals current consumption sub-curves Ci,j, each corresponding to the execution of step 3A or of step 3B of the algorithm LIM. The identification of the group of sub-curves within the general current consumption curve is done by, as a first step, performing a conventional SPA. The first identification is done manually during a development phase of the test program. The subsequent identifications may be automated by supplying a temporal marking point for the marking of sub-curves to the test program.

Once this first step has been completed, the test program has the following sub-curves:

$C0,0$ = consumption sub-curve of calculation $a0*a0$ or $a0*m0$,
$C0,1$ = consumption sub-curve of calculation $a0*a1$ or $a0*m1$
$C0,l-1$ = consumption sub-curve of calculation $a0*al-1$ or $a0*ml-1$
...
$C1,0$ = consumption sub-curve of calculation $a1*a0$ or $a1*m0$
$C1,1$ = consumption sub-curve of calculation $a1*a1$ or $a1*m1$
...
$C1,l-1$ = consumption sub-curve of calculation $a1*al-1$ or $a1*ml-1$
...
$Ci,0$ = consumption sub-curve of calculation $ai*a0$ or $ai*m0$
$Ci,1$ = consumption sub-curve of calculation $ai*a1$ or $ai*m1$
...
$Ci,l-1$ = consumption sub-curve of calculation $ai*al-1$ or $ai*ml-1$
$Cl-1,0$ = consumption sub-curve of calculation $al-1*a0$ or $al-1*m0$
$Cl-1,1$ = consumption sub-curve of calculation $al-1*a1$ or $al-1*m1$
...
$Cl-1,l-1$ = consumption sub-curve of calculation $al-1*al-1$ or $al-1*ml-1$ The test program thus has $l^2$ sub-curves $C0,0$ to $Cl-1,l-1$ (Cf. table 1). The test program then applies a DPA or CPA analysis to this set of sub-curves, to determine whether the operation performed by the algorithm is of the type $ai*aj$ or of the type $ai*mj$.

The test process according to the invention may therefore be qualified as "horizontal", in contrast with conventional DPA- or CPA-based test processes that require a superposition of current consumption curves and may therefore be qualified as "vertical".

Implementation of the Test Process Based on CPA

FIG. 9 partially shows the $l^2$ current consumption sub-curves $Ci,j$ ($C0,0$, $C0,1$, ..., $Ci,j$, ..., $Cl-1,l-1$) of a curve $Cs'$ relative to the execution of a multiplication.

The sub-curves $Ci,j$ are used to determine whether the modular exponentiation algorithm requested that the multiplication algorithm execute the operation $a*a$ or the operation $a*m$, which will results, at the level of the multiplication algorithm, in the execution of $l^2$ operations $ai*aj$ or of $l^2$ operations $ai*mj$.

Indeed, if the algorithm LIM is called by step 3A of the exponentiation algorithm, the inputs of the algorithm are:

$x=a=(al-1\ al-2\ldots a0)b$ $y=a=(al-1\ al-2\ldots a0)b$ and step 2 of the algorithm LIM thus includes the following calculation:

—for j from 0 to l-1 do:

$u|v \leftarrow (Ri+j+aj*ai)+c$

If however the algorithm LIM is called at step 3B of the exponentiation algorithm, the inputs of the algorithm are:

$x=a=(al-1\ al-2\ldots a0)b$ $y=m=(ml-1\ ml-2\ldots m0)b$ and step 2 of the algorithm LIM thus includes the following calculation:

—for j from 0 to l-1 do:

$u|v \leftarrow (Ri+j+aj*mi)+c$

Each sub-curve Ci,j is formed by P current consumption points W0,i,j, W1,i,j, W2,i,j, ..., Wk,i,j, ..., WP-1,i,j and forms a subset of points. It will be noted that the points considered here are those that will be used in the correlation calculation that follows. Indeed, in practice, according to the sampling frequency with which the current consumption points are captured, each sub-curve could include a greater number of points than those used for the calculations.

The test program associates the points of a same sub-curve Ci,j with at least one hypothesis concerning the operation executed by the integrated circuit. This hypothesis is chosen among two possible hypotheses, the first being that the integrated circuit calculates ai*aj and the second that the integrated circuit calculates ai*mj.

Following the principles of CPA reviewed above, the test program then uses a linear current consumption model to transform a hypothesis about the operation executed by the integrated circuit into a corresponding estimated current consumption value, or "correlation model". According to a simplified approach, the test program can be configured to determine the estimated current consumption value by calculating the Hamming weight (number of bits at 1) of the most significant variable of the considered operation, or of a combination of most significant variables.

It is assumed, as an example, that the test program tries to verify the hypothesis ai*mj. The value HWi,j of current consumption estimated for this hypothesis is thus calculated using the following relation:

$$HWi,j=H(mj)$$

Other variations of this model may be provided, for example:

$$HWi,j=H(ai*mj)$$

A more complex model may also be used, such as:

$$HWi,j=H(\alpha*ai+\beta*mj)$$

where $\alpha$ and $\beta$ are weighting coefficients to be set as a function of the microprocessor or of the coprocessor that executes the multiplication, after a characterization thereof.

It may be noted that the model HWi,j=H(ai) cannot be used to verify the hypothesis ai*mj because the term ai is present in the two hypotheses ai*aj and ai*mj and is therefore not a valid discriminant.

It will clearly appear to the skilled person that any other statistically valid model can be used to estimate the electric consumption. In particular, more complex models may be used wherein the value of the calculation register of the integrated circuit is not considered as constant but rather dependant upon preceding operations and on the structure of the circuit.

It may also be noted that the test program is able to calculate, on the basis of the model supplied thereto, the estimated consumption values HWi,j because all the components ai of the variable a and all the components mj of the message m are known. The value of the variable a is deduced from preceding iterations for which the test program has discovered the exponent d bit values, or is equal to 1 if it is the first iteration of the modular exponentiation algorithm. The value of m is known because the message was generated and sent by the test program.

Then, as shown in FIG. 9, the test program defines horizontal transversal subsets of points HEk (HE0, HE1, HE2, ..., HEk, ..., HEP-1), each including points Wk,i,j of the same rank k taken from each of the sub-curves Ci,j. Each horizontal transversal subset HEk is shown in FIG. 9 by dashed lines and thus contains a number of points equal to the number 12 of basic multiplication operations ai*mj.

An estimated current consumption point HWi,j is then associated with each point Wk,i,j of a horizontal transversal subset HEk. This estimated point corresponds to the hypothesis concerning the estimated consumption in relation with the curve Ci,j to which the point belongs, and is calculated in the same manner as indicated above.

Then, for each horizontal transversal subset HEk, the test program calculates a horizontal correlation coefficient HCk between points Wk,i,j of the considered subset and the estimated consumption points HWi,j with which they are associated. The correlation coefficient HCk is, for example, calculated using the following relation:

$$HC_k = \frac{\text{cov}(W_{k,i,j}, HW_{i,j})}{\sigma_{W_{k,i,j}}\sigma_{HW_{i,j}}}$$

or:

$$HC_k = \frac{l^2\sum(W_{k,i,j}HW_{i,j}) - \sum W_{k,i,j}\sum HW_{i,j}}{\sqrt{l^2\sum W_{k,i,j}^2 - (\sum W_{k,i,j})^2}\sqrt{l^2\sum HW_{i,j}^2 - (\sum HW_{i,j})^2}}$$

that is to say the covariance between the points Wk,i,j and the points HWi,j, normalized by the product of their standard deviations $\sigma(W_{k,i,j})$ and $\sigma(HW_{i,j})$, HCk thus being between −1 and +1.

Therefore, as shown by table 2 below (also shown in FIG. 10), a horizontal correlation coefficient HCk corresponding to the hypothesis to be verified is associated with each horizontal transversal subset HEk.

TABLE 2

| $C_{0,0}\rightarrow$ | $W_{0,0,0}$ | $HW_{0,0}$ | $W_{1,0,0}$ | $HW_{0,0}$ | ... | $W_{k,0,0}$ | $HW_{0,0}$ | ... | $W_{P-1,0,0}$ | $HW_{0,0}$ |
|---|---|---|---|---|---|---|---|---|---|---|
| $C_{0,1}\rightarrow$ | $W_{0,0,1}$ | $HW_{0,1}$ | $W_{1,0,1}$ | $HW_{0,1}$ | ... | $W_{k,0,1}$ | $HW_{0,1}$ | ... | $W_{P-1,0,1}$ | $HW_{0,1}$ |
| $C_{0,2}\rightarrow$ | $W_{0,0,2}$ | $HW_{0,2}$ | $W_{1,0,2}$ | $HW_{0,2}$ | ... | $W_{k,0,2}$ | $HW_{0,2}$ | ... | $W_{P-1,0,2}$ | $HW_{0,2}$ |
| ... | ... | ... | ... | ... | ... | ... | ... | ... | ... | ... |
| $C_{i,j}\rightarrow$ | $W_{0,i,j}$ | $HW_{i,j}$ | $W_{1,i,j}$ | $HW_{i,j}$ | ... | $W_{k,i,j}$ | $HW_{i,j}$ | ... | $W_{P-1,i,j}$ | $HW_{i,j}$ |
| ... | ... | ... | ... | ... | ... | ... | ... | ... | ... | ... |
| $C_{l-1,l-1}\rightarrow$ | $W_{0,l-1,l-1}$ | $HW_{l-1,l-1}$ | $W_{1,l-1,l-1}$ | $HW_{l-1,l-1}$ | ... | $W_{k,l-1,l-1}$ | $HW_{l-1,l-1}$ | ... | $W_{P-1,l-1,l-1}$ | $HW_{l-1,l-1}$ |
| | $HE_0\uparrow$ | | $HE_1\uparrow$ | | ... | $HE_k\uparrow$ | | ... | $HE_{M-1}\uparrow$ | |
| | $HC_0$ | | $HC_1$ | | ... | $HC_k$ | | ... | $HC_{P-1}$ | |

As shown in FIGS. 11A, 11B, the test program thus obtains a horizontal correlation curve HCC1 that confirms the hypothesis studied, or a horizontal correlation curve HCC2 that invalidates the hypothesis. Curve HCC1 or HCC2 includes correlation coefficients HC0, HC1, ..., HCk, ..., HCP-1. Curve HCC1 presents one or more correlation peaks (values close to +1 or −1) whereas curve HCC2 does not present correlation peaks.

The confirmation of the studied hypothesis includes for example the search, by the test program, for at least one correlation peak. The search for this correlation peak includes the search for at least one correlation coefficient of which the absolute value is included between a minimum correlation value HCmin and 1. The minimum correlation value is chosen to be sufficiently close to 1 so that a correlation exists.

If the hypothesis according to which the executed operation is ai*mj is confirmed by correlation peaks, the test program deduces that the integrated circuit was performing the operation ai*mj when the sub-curves C0,0 to Cl-1,l-1 of the curve Cs' were captured, and that the bit ds of the modular exponentiation exponent is 1 (the relation between s' and s was indicated above).

It may be noted that the fact that the correlation curve HCC1 corresponding to the correct hypothesis does not present correlation peaks for each measured consumption point signifies that some consumption points are not linked to the execution of the studied operation but are rather linked to another activity conducted by the integrated circuit at the same time as execution of the algorithm.

In addition, the test program can be configured to also analyze the complementary hypothesis, that is ai*aj, in particular if the first hypothesis turns out to be incorrect, and thus searches for at least one correlation peak to decide whether this other hypothesis is correct or not.

Alternatively, the test program can be configured to consider that the complementary hypothesis is correct if the first hypothesis is not confirmed by the correlation curve. It turns out that after a period of test program development and of current consumption best estimator search, the test program becomes reliable such that it is no longer necessary to verify the two hypotheses.

In one embodiment, the hypothesis a*m can also be verified several times by the test program by using several correlation models such as H(mj) and H(ai*mj).

In another embodiment, the verification that the hypothesis a*m is correct for a sub-curve Cs' of rank s' can be done by referring to points of the following sub-curve Cs'+1. Due to the structure of the modular exponentiation algorithm, the result of the previous iteration is included in the variable a of the following iteration. In this case, and contrary to what has been indicated above, the term ai can be a valid discriminant for the estimation of the current consumption.

Implementation of the Test Process Based on DPA

The $l^2$ horizontal consumption sub-curves Ci,j also allow for the implementation of the test process by way of a DPA-type technique.

The analysis requires an acquisition step and a processing step. The acquisition step only includes the acquisition of a single consumption curve Cs', including the sub-curves Ci,j. It is to be noted that this acquisition could, in certain cases, be combined with a vertical acquisition, requiring the sending of several messages to the integrated circuit. Nevertheless, due to the large number of sub-curves offered by the process according to the invention (Cf. table 1 above), the number of vertical acquisitions is low compared with the number of vertical acquisitions required by conventional DPA or CPA.

Therefore, the test program carries out DPA processing steps on a single curve Cs' (FIG. 9), by considering the horizontal sub-curves Ci,j of curve Cs' as independent curves that need to be classed.

The test program estimates the consumption of each calculation step corresponding to each sub-curve by using a consumption model similar to that used for the CPA-based implementation described above. More particularly, a sub-curve sorting function f(ai,mj) is used by the test program, for example:

f(ai,mj)=Hamming weight of one or more bits of mj, or
f(ai,mj)=Hamming weight of one or more bits of ai*mj, or
f(ai,mj)=Hamming weight of one or more bits of ai and of one or more bits of mj.

The test program then classes the measured consumption sub-curves Ci,j into two groups G0 and G1, for the hypothesis considered:

—G0={sub-curves Ci,j that should correspond to a low consumption of the integrated circuit at the step ai*mj considered},
—G1={sub-curves Ci,j that should correspond to a high consumption of the integrated circuit at the step ai*mj considered}.

For example, as shown in FIG. 9, the sub-curves C0,0 and Cl-1,l-1 shown are classed in the group G0 whereas the sub-curve C0,1 is classed in the group G1.

The test program then calculates:
a first average curve M0 (schematically shown in FIG. 12A) of which each point M0Wk of rank k (M0W0, M0W1, ..., M0Wk, ..., M0WP-1) is equal to the average of points Wk,i,j of the same rank k of all the sub-curves Ci,j of the group G0,
a second average curve M1 (schematically shown in FIG. 12B) of which each point M1Wk of rank k (M1W0, M1W1, ..., M1Wk, ..., M1WP-1) is equal to the average of points Wk,i,j of the same rank k of all the sub-curves Ci,j of the group G1, and
a statistical differential curve DM, or average difference curve, (schematically shown in FIG. 12C) of which each point DWk of rank k (DW0, DW1, ..., DWk, ..., DWP-1) is equal to the difference of points M0Wk and M1Wk of the same rank k of average curves M0 and M1.

If one or several current consumption peaks appear in the statistical differential curve DM at the location chosen for the current consumption estimation, the test program deduces that the hypothesis about the exponent bit value is correct. Therefore, the operation executed by the modular exponentiation algorithm is LIM(a,m). If no consumption peak appears, the test program can consider that the complementary hypothesis is verified (dv-s=0) and that the operation executed is LIM(a,a), or proceed in a similar manner to verify the complementary hypothesis.

The test program's search for a consumption peak, which is equivalent to the search for a correlation peak with the embodiment based on CPA, includes, for example, the search for differential consumption points DWk with a value greater than or equal to a minimum consumption value DWmin.

Other Applications of Embodiments of the Invention

It will clearly appear to the skilled person that embodiments of the test process according to the invention may be applied to the testing of integrated circuits implementing various types of algorithms (cryptographic or not, modular exponentiation or not), if such algorithms include a conditional branching leading to the execution of multiplication operations based upon different operands.

Fundamentally, embodiments of the invention may be applied to the testing of integrated circuits implementing any type of multiplication algorithm including a plurality of basic multiplications xi*yj, such as COMBA or KARATSUBA multiplications, in relation with a higher-level algorithm calling the multiplication algorithm by the intermediary of a conditional branching. Embodiments of the invention may also be applied to the testing of integrated circuits using a modular multiplication function including a reduction function, such as for example the Montgomery function, the Quisquater function, or Sedlak's ZDN multiplication, which also include a plurality of basic multiplications xi*yj.

In all these applications, the invention allows for the evaluation of hypotheses about the conditional branching, in order to deduce a secret data upon which the conditional branching depends, and the realization of test systems for the qualification or the certification of integrated circuits. The integrated circuits are rejected as incapable of conserving a secret if the secret can be discovered by the test system.

Effectiveness of Conventional Countermeasures

So that integrated circuits can successfully complete conventional qualification or certification processes, integrated circuit designers generally provide countermeasures thereinto, the most common of which are the following:
i) Randomization of the exponent d:

The exponent d is replaced by a random exponent d' such as:

$$d' = d + K$$

with K a multiple of the order of the multiplicative group wherein the calculations are performed.

For example, in the case of the RSA algorithm $K = k*\phi(n)$, with k a random number and $\phi$ Euler's function, such as $\phi(n) = (p-1)*(q-1)$, p and q being integers such that $p*q = 1$.
ii) Additive randomization of the message m and of the exponentiation module n:

The received message m is transformed into a message m* such that:

$$m^* = m + r1*n \text{ modulo } r2*n$$

that is:

$$m = m + u*n$$

with $u = r1$ modulo r2,
r1, r2 being random numbers that are different for each new cryptographic calculation cycle.
iii) Multiplicative randomization of the message m:

The received message m is transformed into a message m* such that:

$$m^* = re*m \text{ modulo } m$$

with r a random number and e a public exponent.

It appears that countermeasure i) is ineffective upon the test process according to embodiments of the invention, and merely allows vertical DPA and CPA to be countered. The test process according to the invention only requires a single consumption curve and allows for the discovery of an exponent d'. The exponent d', even though it is derived from the initial exponent d, can be used as a secret key to execute the modular exponentiation, the same as the initial exponent.

Concerning countermeasures ii) and iii), it equally appears that the test process according to embodiments of the invention allows, by introducing hypotheses about the value of the randomized message into the hypothesis, to breach such countermeasures. This is due to the fact that it is based on the horizontal transversal statistical processing of a single consumption curve related to a single message instead of on a statistical vertical transversal processing based on several consumption curves related to several messages. These countermeasures multiply the number of hypotheses to treat and slow down the execution of the process of the invention but do not prevent the determination of which operation is executed by the integrated circuit, unless the number of hypotheses to treat is too large.

Appropriate Countermeasures

Embodiments of the invention relate to the provision of a countermeasure allowing an integrated circuit to be considered as able to be used after a qualification or certification test including the process of embodiments of the invention.

It is proposed here to protect a multiplication algorithm against a horizontal analysis according to embodiments of the invention by randomizing the execution order of basic multiplications $xi*yj$. This randomization includes either the randomization of the processing order of xi while conserving the processing order of yj for each xi chosen (partial randomization), or else the randomization of the processing order of xi and of the processing order of yj (complete randomization).

As an example of partial randomization, the following multiplication sequence:

$$xi*y0 - xi*y1 - xi*y3 - xi*y4 \ldots xi*yl-1$$

becomes for example (randomly):

$$xi*y15 \; xi*y5 \; xi*y18 \; xi*yl-1 \ldots xi*y2$$

If the randomization is complete, all the multiplication sequences $xi*yj$ are executed in any order.

Example of a randomized LIM algorithm with partial randomization

---

Inputs:
$x = (xl-1, xl-2, \ldots x0)b$
$y = (yl-1, yl-2, \ldots y0)b$
Output: $R = LIM(x,y) = x*y = (R2l-1 \; R2l-2 \ldots R0)b$
Step 1 :
Calculate or receive a permutation vector $\alpha$ such that
$\alpha = (\alpha l-1, \alpha l-2, \ldots \alpha 0)$
Step 2 :
For i from 0 to 2l-1 do : $Ri = 0$
Step 3 :
For h from 0 to l-1 do :
   $i \leftarrow \alpha i \; ; \; c \leftarrow 0$
   for j from 0 to l-1 do :
      $u|v \leftarrow (Ri+j + xi*yj) + c$
      as long as c is different than 0, do :
         $u|v \leftarrow Ri+j + c$
         $Ri+j \leftarrow v$ and $c \leftarrow u$
         $j \leftarrow j+1$
Step 4 : Return(R)

---

Such a randomized LIM algorithm may be executed by software or by a hardware circuit.

Such a randomization can, in addition, be combined with an additive or subtractive masking of components xi, of components yj, or of both, consisting in combining by addition or by subtraction the component xi and/or the component yj with a random or pseudo-random number R' or with two random or pseudo-random numbers R', R''. In this case, the multiplication step $xi*yj$ in the algorithm above becomes for example:

$$u|v \leftarrow (Ri+j+(xi-R')*yj)+c+yj*R'$$

Another example using two random numbers R' and R'':

$$u|v \leftarrow (Ri+j+(xi-R')*(yj-R''))+c+yj*R'xi*R''+yj*R'+R'*R''$$

FIG. 13 shows a randomized multiplier hardware SMT2 which differs from the multiplier SMT1 described in relation with FIG. 6 in that it includes a sequencer SM2 (state machine, micro-programmed sequencer, . . . ) configured to execute the multiplication algorithm in the manner that has just been described. That is, by randomizing the processing order of components xi or by randomizing the processing order of components xi and the processing order of components yj, with an optional additive or subtractive randomization of these components.

The permutation vector $\alpha$ is here a random word RDM that is supplied to the multiplier SMT2 by an external random or pseudo-random word generator RGEN, but could also be generated internally by the multiplier SMT2. One or more other random words can be supplied to the multiplier or generated by it if the randomization option of components xi, yj is kept.

In one embodiment, the sequencer SM2 is configured to offer two functioning modes: a conventional functioning mode where it executes the multiplication in a conventional manner, and a functioning mode randomized according to the invention. The functioning mode is selected by means of a configuration signal MODE applied to the multiplier, as shown in FIG. 13, or by way of a flag MODE programmed in a configuration register of the multiplier.

FIG. 14 shows an integrated circuit CIC2 arranged on a portable support HD such as a plastic card, and equipped with countermeasure means according to the invention. The integrated circuit includes the same units as the integrated circuit CIC1 described above in relation with FIG. 1, and differs therefrom in that the coprocessor CP1 is replaced by a coprocessor CP2 including the randomized multiplier SMT2 of FIG. 13. In another embodiment, the coprocessor CP1 only includes the randomized multiplier SMT2, and is not designed to perform the randomized multiplication (arithmetic accelerator). In other embodiments, the coprocessor CP1 may include a component configured to completely execute the modular exponentiation function, including the randomized multiplication, or even a component configured to completely execute a cryptographic function including the modular exponentiation function. In yet another embodiment, the randomized multiplication according to the invention is executed by the microprocessor MP.

It will be noted that in the present description and the claims, the terms "random" or "pseudo-random" designate a number that is not known by the evaluator or by the test process and is not predictable for a person that does not know the secrets of the integrated circuit. In particular, a number is considered as "random" or "pseudo-random" in the sense of the present application if it is generated by a deterministic function (and therefore non random by nature) which uses a secret parameter to generate this number.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A process for testing an integrated circuit device, comprising:
    causing, by an execution component, the integrated circuit to execute a multiplication operation of two binary words x and y, the multiplication operation comprising splitting, by the integrated circuit, the binary words x and y into their respective components xi and yj, and performing, by the integrated circuit, a plurality of basic multiplication steps of the components xi of the word x by the components yj of the word y;
    measuring, by a measuring module, a physical property of the integrated circuit during the multiplication of the components, the physical property presenting variations that are representative of binary data switching within the integrated circuit;
    collecting, by the measuring module, a set of points of the physical property;
    dividing, by a data processing component, the collected set of points of the physical property into a plurality of subsets of lateral points, each subset of lateral points corresponding to a basic multiplication operation of the component xi of rank i of the word x by the component yj of rank j of the word y;
    forming, by the data processing component, at least one general hypothesis about at least one of a value of the word x and a value of the word y;
    for each subset of lateral points, forming, by the data processing component, a particular hypothesis about a value of at least one of the component xi and of the component yj linked to the general hypothesis;
    for each subset of lateral points, calculating, by the data processing component, an estimation of the value of the physical property that is a function of the particular hypothesis, and attributing the estimation to the subset of lateral points and to the points of the subset of lateral points; and
    applying, by the data processing component, to the subsets of lateral points a step of horizontal transversal statistical processing using the estimations of the value of the physical property associated therewith, to determine whether the general hypothesis is correct.

2. The process according to claim 1, wherein the step of horizontal transversal statistical processing comprises:
    forming horizontal transversal subsets of points, each having points of the same rank belonging to different subsets of lateral points,
    forming a set of correlation coefficients by calculating, for each horizontal transversal subset, a correlation coefficient between the points of subset and the particular estimations of the value of the physical property associated with each of the points of the subset, and
    determining whether the general hypothesis is correct or not as a function of the profile of the set of correlation coefficients.

3. The process according to claim 2, wherein determining whether the general hypothesis is correct includes searching for at least one correlation peak in the set of correlation coefficients.

4. The process according to claim 1, wherein the step of horizontal transversal statistical processing comprises:
    classing the subsets of lateral points in first and second groups as a function of the estimation of the value of the physical property that is attributed thereto, by allocating to the first group the subset of points having a high estimation and to the second group a low estimation of the physical property,
    calculating average values of points of the same rank of each subset of the first group to obtain a first subset of average points,
    calculating average values of points of the same rank of each subset of points of the second group to obtain a second subset of average points,
    forming a subset of differential points having differential points equal to the difference between points of the same rank of the first and of the second subsets of average points, and
    determining whether the general hypothesis is correct or not as a function of the profile of the subset of differential points.

5. The process according to claim 4, wherein determining whether the general hypothesis is correct includes searching for one or more peaks of the physical property in the subset of differential points.

6. The process according to claim 1, wherein calculating an estimation of the value of the physical property for each subset of lateral points includes calculating a Hamming weight of data that is a function of the value of at least one of the component xi and of the component yj associated with the subset of lateral points according to the particular hypothesis linked to the general hypothesis.

7. The process according to claim 6, wherein the data function of the value of at least one of the component xi and yj is equal to one of the following values: xi, yj, xi*yj, α*xi+β*yj, α and β being weighting coefficients.

8. The process according to claim 1, wherein the physical property is one of a current consumption of the integrated circuit, a magnetic field absorption, and an electromagnetic radiation of the integrated circuit, or a combination thereof.

9. The process according to claim 1, further comprising rejecting the integrated circuit if the statistical processing step verifies that the general hypothesis is correct.

10. A process applied to an integrated circuit having a processing function of external data, the execution of which includes conditional branching to at least a first step of multiplication of binary words x, y or a second step of multiplication of the binary words x, y, the conditional branching being a function of a private data of the integrated circuit, and a multiplication function configured to execute the multiplication steps designated by the conditional branching in a plurality of basic multiplication steps of components xi by components yj of the words x, y, the process further comprising:
 addressing the external data to the integrated circuit;
 activating, by an execution component, in the integrated circuit, the processing function of the external data;
 collecting, by a measuring component, a set of points of a physical property of the integrated circuit representative of switching of binary data by the integrated circuit during the execution by the integrated circuit of a multiplication that is the function of the conditional branching;
 forming, by a data processing component, at least one general hypothesis about the value of the private data and the value of the binary words x, y subject to multiplication, in relation with the value of the private data;
 dividing, by the data processing component, the set of collected points into a plurality of subsets of lateral points, each subset of lateral points corresponding to a basic multiplication operation of the component xi of rank i of word x by the component yj of rank j of word y, wherein the words x and y are split into the components xi and yj by the integrated circuit;
 for each subset of lateral points, forming, by the data processing component, a particular hypothesis about a value of at least one of the component xi and of the component yj linked to the general hypothesis;
 for each subset of lateral points, calculating, by the data processing component an estimation of the value of the physical property that is a function of the particular hypothesis, and attributing this estimation to the subset of lateral points and to the points of the subset of lateral points; and
 applying, by the data processing component, to the subsets of lateral points, a step of horizontal transversal statistical processing by using the estimations of the value of the physical property associated therewith, to determine whether the general hypothesis about the value of the private data is correct.

11. The process according to claim 10, including rejecting the integrated circuit as unable to conserve the secret data if the statistical processing step verifies that the general hypothesis is correct.

12. The process according to claim 10, applied to an integrated circuit wherein the data processing function is a modular exponentiation function, the private data being an exponent of the modular exponentiation function.

13. The process according to claim 10, applied to an integrated circuit wherein the data processing function is a cryptographic function including a modular exponentiation function, the private data being an exponent of the modular exponentiation function forming a private key of the cryptographic function.

14. A system for testing an integrated circuit, comprising:
 an execution component configured to make the integrated circuit execute a multiplication operation of two binary words x and y, the multiplication operation including a plurality of basic multiplication steps of components xi of the word x by components yj of the word y, wherein the words x and y are split into their components xi and yj by the integrated circuit;
 a measuring component configured to:
  measure during the execution of the multiplication operation, a physical property of the integrated circuit presenting variations that are representative of the switching of binary data by the integrated circuit; and
  collect a set of points of the physical property; and
 a data processing component, configured to:
  divide the collected set of points of the physical property into a plurality of subsets of lateral points, each subset of lateral points corresponding to a basic multiplication operation of the component xi of rank i of the word x by the component yj of rank j of the word y,
  forming at least one general hypothesis about at least one of a value of the word x and a value of the word y,
  for each subset of lateral points, forming at least one particular hypothesis about a value of at least one of the component xi and of the component yj linked to the general hypothesis,
  for each subset of lateral points, calculating an estimation of the value of the physical property that is a function of the particular hypothesis, and attributing this estimation to the subset of lateral points and to the points of the subset of lateral points, and
  applying, to the subset of lateral points, a step of horizontal transversal statistical processing by using the estimations of the value of the physical property that are attributed to the lateral points, to determine whether the general hypothesis is correct.

15. The system according to claim 14, wherein the system is configured to reject the integrated circuit if the statistical processing step verifies that the general hypothesis is correct.

16. The system according to claim 14, wherein the measuring component is configured to measure one of a current consumption of the integrated circuit, a magnetic field absorption, and an electromagnetic radiation of the integrated circuit, or a combination thereof.

* * * * *